Nov. 24, 1931.  K. SCHMIDT  1,833,265
INTERNAL COMBUSTION ENGINE FOR GASEOUS AND LIQUID FUELS
Filed June 23, 1928  3 Sheets-Sheet. 1

Nov. 24, 1931.  K. SCHMIDT  1,833,265
INTERNAL COMBUSTION ENGINE FOR GASEOUS AND LIQUID FUELS
Filed June 23, 1928   3 Sheets-Sheet 3
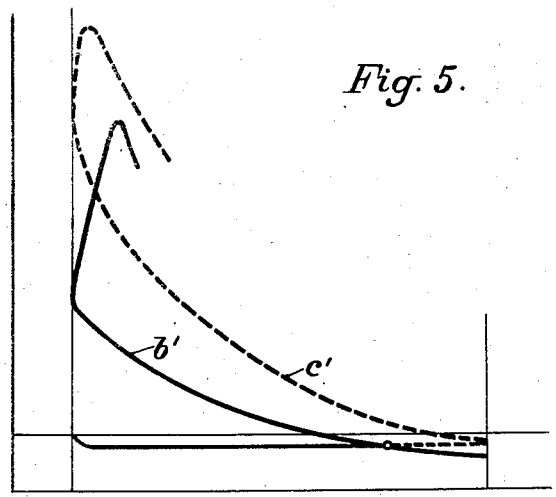
Fig. 5.
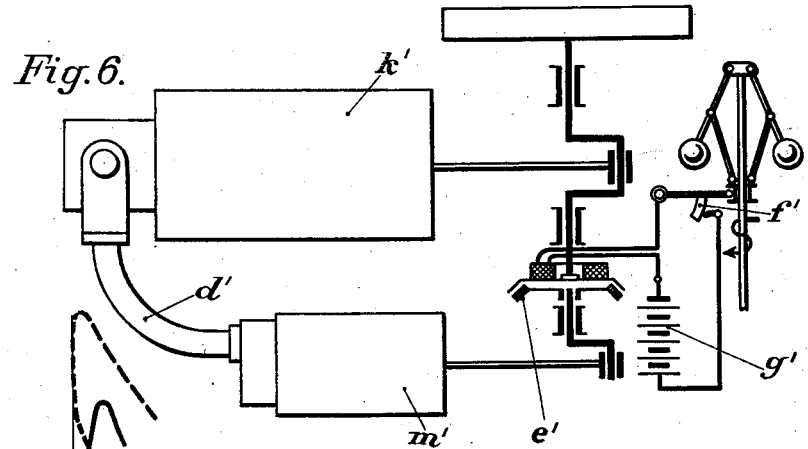
Fig. 6.
Fig. 7.
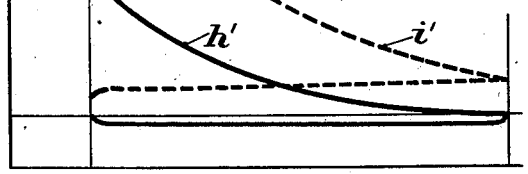
Witnesses:  Inventor:

Patented Nov. 24, 1931

1,833,265

UNITED STATES PATENT OFFICE

KURT SCHMIDT, OF COLOGNE-HOLWEIDE, GERMANY, ASSIGNOR TO MOTORENFABRIK DEUTZ, AKTIENGESELLSCHAFT, OF COLOGNE-DEUTZ, GERMANY

INTERNAL COMBUSTION ENGINE FOR GASEOUS AND LIQUID FUELS

Application filed June 23, 1928, Serial No. 287,846, and in Germany, June 23, 1927.

The invention has among its objects the provision of an internal combustion engine which will secure the advantages of both a motor operating on liquid fuel and a motor operating on gaseous fuel, while eliminating the disadvantages of both. It will be understood that a motor operating on liquid fuel, as distinguished from one operating on gaseous fuel, commonly may be more readily placed in operation and commonly is more adaptable for use in situations where it is subjected to variable loads or to suddenly applied and continuous overloads. However, due to the greater fuel cost, motors operating on liquid fuel are more expensive to operate than those operating on gaseous fuel, especially where the latter is supplied from a gas generator or is natural gas.

The invention will be best understood from the following description when read in the light of the accompanying drawings of several embodiments of the invention, while the scope of the invention will be more particularly pointed out in the appended claims.

In the drawings:—

Fig. 1 more or less diagrammatically shows a motor and associated apparatus arranged for operating with liquid and gaseous fuel according to the invention;

Fig. 5 is an indicator diagram of the motor according to Fig. 4;

Fig. 6 shows a modification in which provision is made for precompressing the air supplied to the motor; and Fig. 7 is an indicator diagram of the motor according to Fig. 6.

Figure 1:
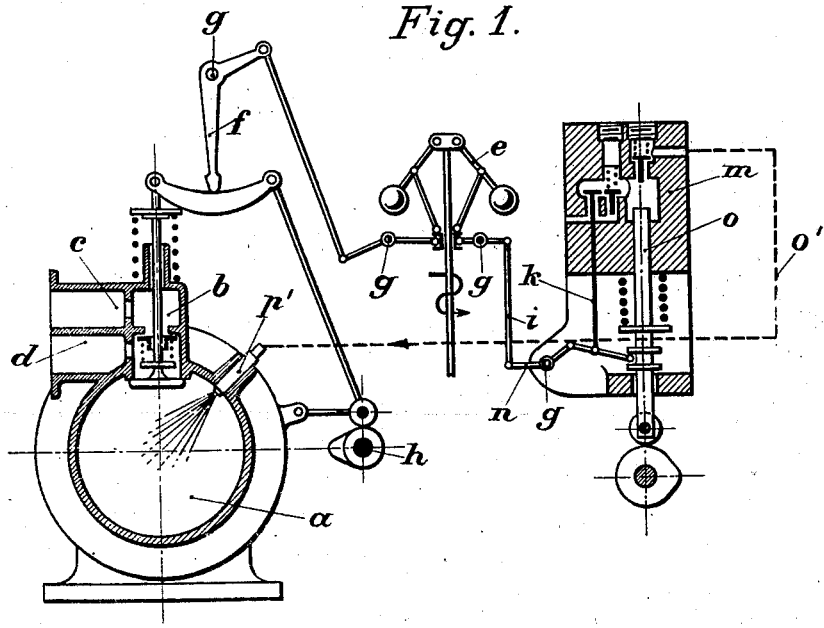

In Fig. 1 is shown an internal combustion engine for using gaseous and liquid fuels, which engine has the inlet and mixing valve $b$. To this valve the gas and air pipes $c$ and $d$ are connected. The lift of valve $b$ may be altered by the movable fulcrum arm $f$, which latter is actuated by governor $e$. The points $g$ are the fixed centre points of the governor gearings. The effective movement of the action of the valve $b$ is caused by the camshaft $h$. The governor also actuates by means of the gearings $i$, the overflow valve $k$ of the oil pump $m$.

Figure 3:
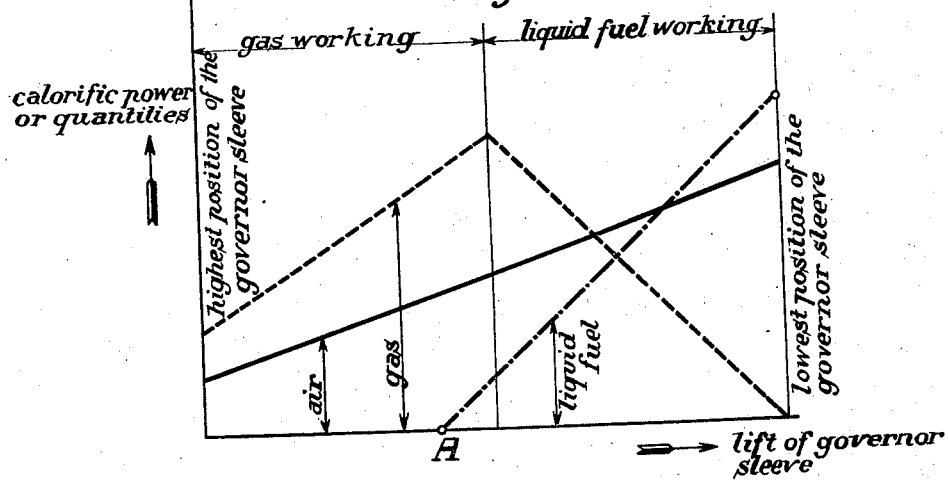
Fig. 3 is a diagram illustrating graphically the relation between the lift of the governor sleeve and calorific values of gaseous and liquid fuel mixtures supplied to the motor.

The governing is effected (see Fig. 3) in such a way, that the combustion engine first works as a gas engine entirely, and is changed from gas to oil-working under predetermined conditions, as when the gas supply fails or is insufficient to meet the load.

For instance, if the supply of gas is diminished, the sleeve of the governor will lower—the load on the engine may be a continuous one—and cause the introduction of oil (acc. to Fig. 3) until the balance between work and load is regained. In this case it is to be understood, that the oil-pump injects the fuel directly into the cylinder.

Analogically the governor, in its lowest position may open the throttling device of a carburetor in such a way, that the cylinder is charged with a benzine-air mixture instead of with a gas-air mixture.

In Fig. 1 the method of working of the governor is shown. The governor is in the position, which corresponds to point A of Fig. 3, in which position the admission of gas has reached almost its highest degree. On the other hand the lever $n$ of the governor device of the fuel pump is in such a position, that the overflow valve $k$ just is closed at the lowest position of plunger $o$. If the governor sleeve slides below the position shown in Fig. 1 the overflow valve will be closed during the delivery stroke of the plunger for some time, and the fuel pump therefore is able to discharge oil. If the engine speed then increases in such a way that the governor sleeve rises to above the position shown in the drawings, the lever $n$ of the fuel pump comes to such a position, that the overflow-valve is opened in every position of the plunger, and therefore the pump is not working.

Figure 2:
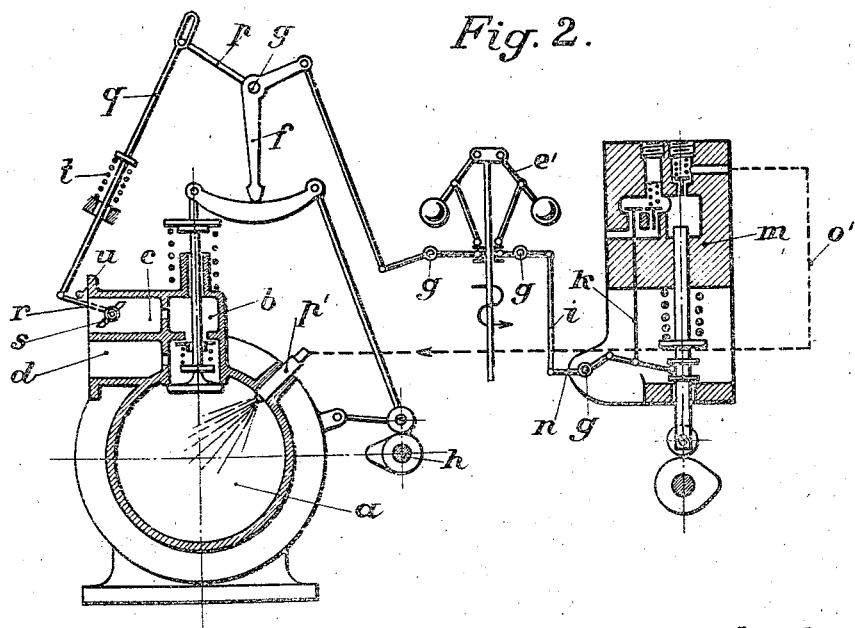
Fig. 2 shows a modified form of the motor and associated apparatus.

It is sometimes undesirable to keep open the gas conduit during sole oil-working. Advantageously according to this invention provision may be made for governing of the motor in such a way, that, after the charge of oil has increased to a certain value, the gas admission is throttled. This is shown in Fig. 2. To the movable fulcrum arm $f$ a lever $p$ is jointed, which latter works the throttle valve $s$ through gearing $g$ and lever $r$. The spring $t$ will draw the lever $r$ towards the stop $u$, that means it will open the throttle valve as much as possible. The upper sleeve of the rod $q$ provides, that the throttle valve will remain in open position, if the governor sleeve rises (gas working). If the governor sleeve lowers (oil working) the throttle valve is closed when it reaches a certain position.

The above described governing relates as well to an internal combustion engine working with a gas-air mixture or with a liquid fuel of low ignition point as to one working with a gas-air mixture of high ignition point and an oil of high boiling point. In both cases the compression for gas and oil working may be kept the same.

If however the engine is used for gas-air mixtures of low ignition points and oil of higher boiling point, the temperature of compression may be different. This may be done, according to the invention, in such way that, under the control of the governor, a heating device, for example an electric heating coil, may be brought into operation for heating the suction air.

Figure 4:
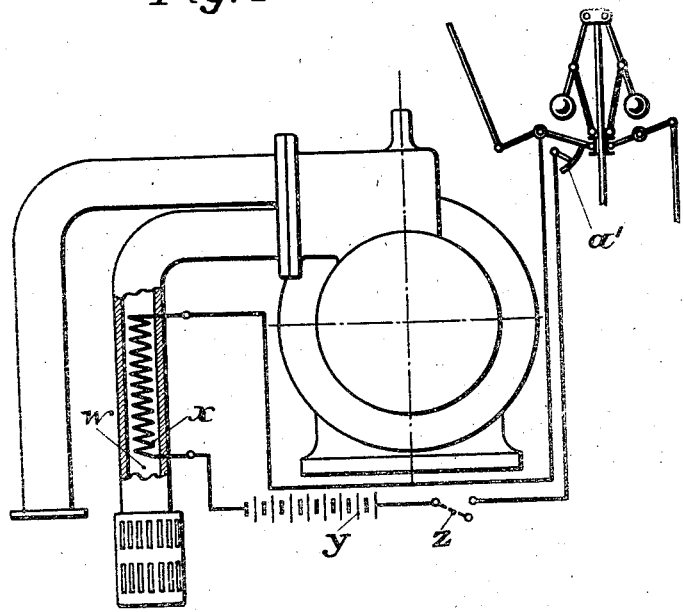
Fig. 4 shows a modification in which provision is made for preheating the air supplied to the motor.

One example of this arrangement is shown in Fig. 4. In the air suction tube $w$ a small electric heating coil $x$ is provided. In circuit of the coil are the battery $y$, the switch $z$ and a contact $a^1$, the latter opened and closed by the governor.

In the lowest position the governor sleeves the contact is closed, and the heating coil warms the suction air in such a way, that the temperature of compression is high enough to ignite the injected gas oil. If an oil of a lower flash point, say benzine is used, no prewarming of the air is necessary and contact $z$ is switched out.

According to Fig. 5 an alteration of the compression temperature may be effected by closing the inlet valve during the last period of the suction stroke according to indicator diagram $b^1$, which diagram indicates the use of gas and benzine.

If the inlet valve is kept open during the whole period of stroke of the engine, there are, according to indicator diagram $c$ high temperatures of compression with gas and oil.

Finally the compression temperatures may be altered by precompression of the suction air. In Fig. 6 $k'$ shows the motor, and $m'$ the compressor, which latter discharges the air through the suction pipe $d'$ into the combustion engine. The compressor is coupled to the engine shaft by means of an electromagnetic friction coupling $e'$, if gas-oil working is desired. The governor, by means of contact $f'$, when in its lowest positions, closes the circuit formed by the clutch energizing coil $e'$ and battery $g'$.

In Fig. 7 the indicator diagrams of an engine working according to this method are shown. Curve $h'$ shows gas-working (precompressor not coupled) and curve $i'$ gas-oil working (precompressor coupled).

I claim therefore:—

1. An expansible chamber type internal combustion engine installation having, in combination, means for delivering gaseous fuel to a combustion space of said engine, a governor responsive to engine load conditions for controlling said means, means for injecting liquid fuel directly into said combustion space at the end portion of the compression stroke of said engine, said governor having provision for rendering said last named means inoperative when the engine speed increases to above a predetermined value.

2. An expansible chamber type internal combustion engine installation having, in combination, means for delivering air to the combustion space of said engine, means for delivering gaseous fuel to said space, means for delivering liquid fuel directly to said space at the end portion of the compression stroke of said engine, a heater for said air, a governor responsive to engine load conditions, and means controlled by said governor for rendering inoperative said means for delivering liquid fuel and said heater when the engine speed increases to above a predetermined value.

3. An expansible chamber type internal combustion engine installation having, in combination, means for delivering air to the combustion space of said engine, means for delivering gaseous fuel to said space, means for delivering liquid fuel directly to said space at the end portion of the compression stroke of said engine, a compressor for said air, a governor responsive to engine load conditions, and means controlled by said governor for rendering inoperative said means for delivering liquid fuel and said compressor when the engine speed increases to above a predetermined value.

4. An expansible chamber type internal combustion engine installation having, in combination, means for delivering air to the combustion space of said engine, means for delivering gaseous fuel to said space, means for delivering liquid fuel directly to said space at the end portion of the compression stroke of said engine, a compressor and a heater for said air, a governor responsive to engine load conditions, and means controlled by said governor for rendering inoperative said means for delivering liquid fuel and said heater when the engine speed increases to above a predetermined value.

KURT SCHMIDT.